3,048,477
PRODUCTION OF ZINC HYDROSULFITE
CRYSTALS
Thomas E. Rogers, Ho-Ho-Kus, N.J., assignor to Jacques Wolf & Co., Newark, N.J., a corporation of New Jersey
No Drawing. Filed Mar. 17, 1961, Ser. No. 96,345
14 Claims. (Cl. 23—300)

This invention relates to the production of zinc hydrosulfite. More particularly it relates to the production of zinc hydrosulfite in the form of large crystals which are readily useable in the paper and textile industries.

It is well known that zinc hydrosulfite is extremely useful as a bleaching and stripping agent in the paper and textile industry. However zinc hydrosulfite when produced by conventional procedures is in the form of a very fine powder which creates a very high dusting and bridging effect when it is used in paper, textile and chemical applications. The high dusting effect when such powders are used is extremely undesirable due to the health hazards which are created. Inhalation of large quantities of zinc hydrosulfite dust will cause serious nosebleeds and other respiratory ailments. The dusting tends to make the plant very dirty and renders feeding and dispersing of zinc hydrosulfite in to reaction systems very difficult. The fine powdery form of the zinc hydrosulfite when produced in the procedures employed by the prior art causes the zinc hydrosulfite to fail to flow or feed out of a hopper unless the hopper is constantly agitated. This results in a non-uniform flow of zinc hydrosulfite and may cause serious irregularities in the process in which the zinc hydrosulfite is used.

In order to avoid these severe dusting and bridging defects some in the prior art have even resorted to the use of zinc chloride as a salting out agent to enhance both the yield and crystal formation of zinc hydrosulfite. However when zinc chloride is used as a salting out agent in the crystallization of zinc hydrosulfite, special safety precautions must be taken because zinc chloride is extremely hazardous to use since it is extremely caustic. Furthermore, when zinc chloride is used as a salting out agent it tends to decompose the zinc hydrosulfite due to the fact that it is rather acid when it is in solution. Zinc hydrosulfite, which has been salted out from an aqueous solution using zinc chloride as a salting out agent tends to be in the form of a fine powder which does not overcome the dusting and bridging effects inherent in other prior art processes.

It is the object of this invention to provide a new and improved method for the production of zinc hydrosulfite.

Another object of this invention is to provide a method for producing zinc hydrosulfite by an efficient, economical process in a crystalline form that will greatly enhance its use in the textile, paper and chemical industries.

Other objects of this invention will in part be obvious and will in part appear hereinafter.

It has been found that the foregoing objects are readily accomplished by a process which involves the steps of treating an aqueous solution of zinc hydrosulfite with glycerine and a pH stabilizing agent such as zinc dust, zinc oxide, zinc carbonate or other basic zinc-containing compounds and mixtures thereof, concentrating the solution by removing water at a controlled rate from the aqueous solution of zinc hydrosulfite, until essentially all of the zinc hydrosulfite contained in the treated solution has crystallized out of the solution and thereafter recovering the zinc hydrosulfite crystals. The aqueous solution containing the zinc hydrosulfite can be prepared by dissolving zinc hydrosulfite into water or it can be the aqueous solution resulting from the preparation of zinc hydrosulfite.

Thus it is readily apparent that this invention can be advantageously utilized directly in the production of zinc hydrosulfite merely by eliminating the prior art recovery steps and substituting theretofore the process of this invention.

The practice of my invention is not limited by the manner of obtaining zinc hydrosulfite. This is because it is directed to the crystallization of zinc hydrosulfite from aqueous solutions containing zinc hydrosulfite and not to the preparation of zinc hydrosulfite itself. The methods of producing zinc hydrosulfite are well known in the art and involve the reaction of metallic zinc, water, and sulphur dioxide in an aqueous medium. The zinc used in the preparation of the zinc hydrosulfite is usually in the form of a finely powdered zinc dispersed in an aqueous medium. The sulphur dioxide can be introduced into the zinc dispersion from a tank of gaseous sulphur dioxide or it may be introduced into the dispersion from a sulphur dioxide generator which utilizes burning sulphur to produce the sulphur dioxide. The aqueous dispersion containing the zinc should be constantly agitated during the addition of sulfur dioxide in order to assure a more complete reaction of the reactants. Upon completion of the reaction, the resulting zinc hydrosulfite is in solution and is ready to be crystallized therefrom.

In carrying out this invention, the aqueous solution of zinc hydrosulfite should contain from about 35 percent to about 75 percent by weight of zinc hydrosulfite, or at least about 25 percent water based on the total weight of the solution. More dilute aqueous solutions of zinc hydrosulfite may be used, but for purposes of economy it is desirable to use aqueous solutions containing at least about 35 percent zinc hydrosulfite. It is believed that when aqueous solutions of zinc hydrosulfite containing more than about 75 percent by weight of zinc hydrosulfite are used, spontaneous nucleation occurs thus preventing the growth of large crystals. The zinc hydrosulfite is readily soluble in water at room temperature and aqueous solutions thereof may be prepared without need for any special equipment. In the preferred embodiment of my invention the aqueous solution should contain from about 35 percent to about 50 percent by weight of water based on the total weight of the solution. The pH of the aqueous solution should be maintained between about 3.6 and 4.4 and in the preferred embodiment of my invention the pH of the aqueous solution containing zinc hydrosulfite is about 4.0. If the pH of the solution is below about 3.6, metallic zinc dust, zinc oxide, and other basic zinc-containing compounds and mixtures thereof may be added to the aqueous solution of zinc hydrosulfite to adjust the pH of the solution to within the range specified above.

The treatment of the aqueous solution of zinc hydrosulfite with glycerine and a pH stabilizing agent is carried out by dividing the solution into two approximately equal portions. Then, to one of the two portions, at least about 2% by weight of glycerine, based on the weight of the zinc hydrosulfite contained in this portion and from about 0.2% to about 0.8% by weight of a pH stabilizing agent, based on the weight of the zinc hydrosulfite contained in this portion are both introduced into this portion of the solution. In the preferred embodiment of my invention I add to one of the two portions approximately 10% by weight of glycerine based on the weight of zinc hydrosulfite contained in this portion and approximately 0.4% by weight of a pH stabilizing agent, based on the weight of the zinc hydrosulfite contained in this portion. Greater amounts of glycerine may be employed if it is so desired. However, no beneficial effect will be gained from employing amounts of glycerine greater than about 10 percent.

The order of admixing the glycerine and pH stabilizing agent is not critical. The glycerine and pH stabilizing agent may be mixed directly with water and thereafter one-half of the zinc hydrosulfite to be crystallized may be added to the aqueous solution, or the glycerine and pH stabilizing agent may be added directly to an aqueous solution of one-half of the zinc hydrosulfite to be crystallized. The latter procedure is particularly advantageous when my invention is directly applied to the recovery of commercially prepared zinc hydrosulfite. The aqueous solution containing zinc hydrosulfite should be agitated during addition of the glycerine and pH stabilizing agent in order to completely mix the glycerine and pH stabilizing agent into the solution.

The removal of water from the treated aqueous solution must be accomplished at a controlled rate which will allow proper crystallization of zinc hydrosulfite. The water contained in the aqueous solution of zinc hydrosulfite must not be removed too rapidly from the solution because the zinc hydrosulfite will crystallize out of the solution in the form of a very fine powder. On the other hand, if the water contained in the aqueous solution of zinc hydrosulfite is removed too slowly, the zinc hydrosulfite crystals thus formed will tend to decompose into other zinc-sulfur containing compounds such as zinc sulfite, zinc sulfide, and zinc sulphate. After water is removed at the desired rate, large crystals of zinc hydrosulfite will be present upon removal of the water.

For the purposes of this invention that portion of the aqueous solution of zinc hydrosulfite which has been treated with glycerine and a pH stabilizing agent and the untreated portion of the aqueous solution hereinafter shall be referred to as part I and part II of the mother liquor repectively. Part I of the mother liquor is then reduced in volume approximately 20 percent by removing water therefrom. The water may be removed by evaporation or distillation at a temperature ranging from about 55° C. to about 75° C. utilizing subatmospheric pressures. Seed crystals of zinc hydrosulfite will appear in part I of the mother liquor when it has been concentrated to approximately 80 percent of its original volume. The water should be removed from part I of the mother liquor at a constant rate ranging from about 0.5 percent to about 1.33 percent by volume per minute, based on the total volume of the part I of the mother liquor being concentrated. After the concentration of part I of the mother liquor, part II of the mother liquor is slowly added to the concentrated part I of the mother liquor while simultaneously removing water from the resulting admixture. The rate of removal of water from the mixed liquors must be approximately equal to the rate of addition of part II of the mother liquor to the concentrated part I of the mother liquor. Thus, upon completion of the addition of part II of the mother liquor to the concentrated part I of the mother liquor, the volume of the mixed liquors is approximately equal to the volume of the concentrated part I of the mother liquor before the addition of part II was carried out. During the addition of part II to part I, the water may be removed by evaporation or distillation at a temperature ranging from about 55° C. to about 75° C. at subatmospheric pressures. Part II of the mother liquor should be added to part I of the mother liquor at a constant rate ranging from about 0.5 percent to about 1.33 percent by volume per minute based on its total volume.

In the preferred embodiment of my invention the concentration of the mother liquor should be accomplished at a constant rate over a period ranging from about 2½ to about 3½ hours at the temperature, pressure and rates specified above. In the preferred embodiment of my invention the volume of the entire mother liquor is reduced to about 40 percent of its original volume in about 3 hours at a temperature ranging from about 55° C. to about 58° C. During the concentration of part I of the mother liquor as well as during the concentration carried out when part II is added to the concentrated part I, constant agitation is carried out to prevent formation of an unworkable mass of zinc hydrosulfite. The mixture of the two parts of the mother liquor is deemed sufficiently concentrated when the mixture appears as a thick viscous slurry. The subatmospheric pressures necessary to effect removal of water at the rate specified above will of course vary as the concentration of the aqueous solution containing the zinc hydrosulfite changes. It is well known that the vapor pressure of a solution is lower than the vapor pressure of the pure solvent, when the solute is a non-volatile solute such as zinc hydrosulfite. Thus it is readily apparent that during the concentration steps of the process disclosed in this invention that the degree of vacuum employed to effect removal of the water from the mother liquor must be increased as the concentration of the zinc hydrosulfite in the mother liquor increases. Thus, the rates of concentration of the mother liquor as specified above can easily be maintained by regulation of the amount of vacuum applied to the system within the temperature ranges specified above. The use of subatmospheric pressures during the two concentration steps assures ready removal of the water at temperatures below 75° C. This is important since zinc hydrosulfite in an aqueous medium decomposes into other zinc-sulfur containing compounds such as zinc sulfite, zinc sulfide and zinc sulphate at temperatures higher than 75° C. The regulation of the subatmospheric pressure is straightforward and is accomplished by using any vacuum producing apparatus such as a vacuum pump, or a steamjet evacuator.

The resulting concentrated mixture of part I and part II of the mother liquor may then optionally be treated with a solvent such as those that are used below in washing the zinc hydrosulfite crystals in order to give a more workable mass and to effect a displacement of water from the zinc hydrosulfite crystals contained in the concentrated mixture. The zinc hydrosulfite crystals are then removed from the concentrated mixture of mother liquor by physical means such as filtration or centrifuging with subsequent decantation of the mother liquor. The crystals may then be washed with solvent until essentially all of the water remaining on the crystals is displaced. Only those water soluble solvents are used which do not react with or dissolve the zinc hydrosulfite crystals and which displace water from the zinc hydrosulfite crystals. Illustrative of solvents which can be used are lower aliphatic alcohols such as methanol, ethanol, proprietary solvent, propanol, isopropanol, butanol, etc. and mixtures thereof. Thereafter, the crystals are dried in any conventional manner.

It is readily apparent from the preceding description that the steps of the present process are related to each other in such a manner that the crystallization of zinc hydrosulfite can be practiced as a batch process. However, this invention is not to be construed as limited to a batch process; and, if desired, the sequence of steps disclosed herein can be practiced in a continuous manner, that is, as a continuous process with equally excellent results.

The advantages which flow from the practice of this invention are numerous. A particularly outstanding and valuable feature of the present invention is that the dusting and bridging effects of zinc hydrosulfite crystals heretofore produced are eliminated thus greatly enhancing the handling and use of zinc hydrosulfite. Also, this invention provides for a continuous as well as a batch method for preparing zinc hydrosulfite crystals which is both efficient and economical. It is efficient because of the high yields and high purity of the zinc hydrosulfite crystals produced thereby. It is economical in that the raw materials used are readily available and relatively quite inexpensive.

For a fuller understanding of the nature and objects of the invention reference should be had to the following example which is given merely as a further illustration of the invention and is not to be construed in a limiting sense.

Example

In this example 700 lbs. of zinc dust was dispersed by agitation in a reaction vessel containing 4150 lbs. of water and the resulting aqueous zinc dispersion was further agitated while sulfur dioxide gas, obtained from a sulfur burner, was liberated throughout the aqueous zinc solution until essentially all of the zinc was reacted with the sulfur dioxide and water to form zinc hydrosulfite. The resulting aqueous solution of zinc hydrosulfite had a pH of 4.0. The aqueous solution was then divided into two approximately equal portions and 100 lbs. of glycerine was added to one of the two approximately equal portions along with 6 lbs. of zinc dust; the approximate volume of each portion being 280 gallons. 60 gallons of water were removed at a constant rate from the first portion which was treated with glycerine and zinc dust over a period of 30 minutes. This was accomplished by heating and agitating the solution at a temperature ranging from 55° C. to 57° C. while maintaining a vacuum pressure between about 25 and 27 inches of mercury with a steamjet evacuator.

The second part was then added to the concentrated first part at a rate of 1.5 gallons per minute while 1.5 gallons per minute of water were constantly removed from the mixture of the two parts by heating and agitating the mixture of the two parts at a temperature ranging from 55° to 57° C. while maintaining a vacuum pressure which varied from about 25 to about 27 inches of mercury, with a steamjet evacuator. Upon completion of the addition of the second part of the solution to the concentrated first part of the solution, the resulting mixture had a volume of 220 gallons, that is, about 40% of the original volume. 30 gallons of proprietary solvent was then added to the resulting mixture and the mixture filtered. The zinc hydrosulfite crystals obtained upon filtration were washed with 30 gallons, 80 gallons and 30 gallons of proprietary solvent respectively. Thereafter the crystals were dried in a vacuum oven to 50° C. at a vacuum pressure of about 28 inches of mercury. The dried crystals weighed 1900 lbs.

From this example it is readily apparent that my invention provides for an improved and highly efficient method of crystallizing zinc hydrosulfite from aqueous solutions. This example illustrates the excellent yield of zinc hydrosulfite obtained when my process is employed. The zinc hydrosulfite crystals obtained in this example did not exhibit any tendency to cause severe dusting when violently agitated. Furthermore they demonstrated excellent flow properties when placed in a hopper.

Having described my invention what I claim as new and desire to secure by Letters Patent is:

1. A process for the production of zinc hydrosulfite crystals comprising dividing an aqueous solution of zinc hydrosulfite containing at least about 25 percent by weight of water based on the total weight of the solution into two approximately equal portions, introducing into the first portion at least about 2% by weight of glycerine, based on the weight of said zinc hydrosulfite in said first portion, and from about 0.2% to about 0.8% by weight of a zinc containing pH stabilizer, based on the weight of said zinc hydrosulfite in said first portion and removing water from the said first portion at a rate of from about ½% to 1½% by volume per minute, based on the original volume of said first portion, by heating said portion at temperatures of from about 55° C. to about 75° C. at subatmospheric pressures until the volume of said first portion is equal to approximately 80% of the original volume of said first portion, adding the second portion to the resulting concentrated first portion at a rate equal to about 1½% to 1⅓% by volume per minute based on the original volume of said second portion while simultaneously removing water from the resulting admixture at a rate equal to the rate of addition of said second portion to said concentrated first portion, by heating said mixture at temperatures of from about 55° C. to about 75° C. at subatmospheric pressures, separating zinc hydrosulfite crystals contained in the resulting concentrated solution and drying said crystals.

2. The process of claim 1, wherein the pH of said aqueous solution of zinc hydrosulfite is from about 3.6 to about 4.4

3. The process of claim 2, wherein said aqueous solution of zinc hydrosulfite has a pH of about 4.0.

4. The process of claim 1, wherein said aqueous solution of zinc hydrosulfite contains from about 25 percent to about 65 percent by weight of water, based on the total weight of said solution.

5. The process of claim 4, wherein said solution contains from about 35 percent to about 50 percent by weight of water, based on the total weight of said solution.

6. The process of claim 1, wherein said first portion of said aqueous solution of zinc hydrosulfite is treated with about 10 percent by weight of glycerine based on the weight of said zinc hydrosulfite in said first portion.

7. The process of claim 1, wherein said first portion of said aqueous solution of zinc hydrosulfite is treated with about 0.4 percent by weight of a zinc containing pH stabilizer, based on the weight of said zinc hydrosulfite in said first portion.

8. The process of claim 1, wherein said water is removed from said first portion at a rate of about 0.66 percent by volume per minute, based on the original volume of said first portion.

9. The process of claim 1, wherein said second portion is added to said concentrated first portion at a rate of about 0.66 percent by volume per minute, based on the original volume of said second portion.

10. The process of claim 1, including the step of displacing residual water present in said zinc hydrosulfite crystals.

11. The process of claim 1, wherein said zinc hydrosulfite crystals contained in the concentrated solutions are recovered by filtration.

12. The process of claim 1, wherein the water in the zinc hydrosulfite crystals is displaced by washing said crystals with a water-soluble solvent which is a nonsolvent for said crystals with at least one member of the group consisting of methanol, ethanol, propanol and butanol.

13. The process of claim 1, wherein said recovered crystals are vacuum dried at a temperature of about 55° C.

14. A process for the production of zinc hydrosulfite crystals comprising dividing an aqueous solution of zinc hydrosulfite containing about 45 percent by weight of water, based on the total weight of said solution, into approximately two equal portions, introducing into the first portion about 10% by weight of glycerine, based on the weight of said zinc hydrosulfite in said first portion, and about 0.4% by weight of a zinc containing pH stabilizer, based on the weight of said zinc hydrosulfite in said first portion and removing water from said first portion at a rate of about 0.66 percent by volume per minute, based on the original volume of said first portion by heating said portion at temperatures of from about 55° C. to about 57.5° C. at subatmospheric pressures until the volume of said first portion is equal to approximately 80% of the original volume of said first portion, adding the second portion to said concentrated first portion at a rate of about 0.66 percent by volume per minute, based on the original volume of said second portion, while simultaneously removing water from the resulting admixture at a rate equal to the rate of addition of said second portion to said concentrated first portion by heating said mixture at temperatures of from about 55° C. to about 57.5° C. at subatmospheric pressures, thereafter filtering said zinc hydrosulfite crystals contained in said concentrated mixture, washing said crystals with at least one member of the group consisting of methanol, ethanol, propanol and butanol, until essentially all water is displaced from said crystals and drying said crystals.

References Cited in the file of this patent
UNITED STATES PATENTS

| | | |
|---|---|---|
| 1,937,944 | Butler | Dec. 5, 1933 |
| 2,899,273 | Murphy | Aug. 11, 1959 |